United States Patent [19]
Tanida et al.

[11] 3,906,251
[45] Sept. 16, 1975

[54] PLURALITY OF SELECTIVE SOURCES FOR CONVERTER SYSTEM

[75] Inventors: Kikuo Tanida, Tokyo; Kenro Teraoka, Chofu; Yuji Inomata, Kawasaki, all of Japan

[73] Assignee: Sony Corporation, Tokyo, Japan

[22] Filed: June 7, 1974

[21] Appl. No.: 477,353

[30] Foreign Application Priority Data
June 9, 1973   Japan.............................. 48-68416

[52] U.S. Cl. .................... 307/45; 307/54; 307/77; 307/80; 307/86; 321/2; 321/18
[51] Int. Cl.² ..................... H02J 1/00; H02M 3/00
[58] Field of Search........... 307/4, 5, 20, 36, 44, 45, 307/46, 54, 77, 80, 85, 86; 321/2, 18

[56] References Cited
UNITED STATES PATENTS

| | | | |
|---|---|---|---|
| 3,297,880 | 1/1967 | Clarke | 307/80 X |
| 3,659,183 | 4/1972 | Carlson | 307/86 X |
| 3,699,352 | 10/1972 | Silver | 307/80 X |

*Primary Examiner*—Gerald Goldberg
*Attorney, Agent, or Firm*—Hill, Gross, Simpson, Van Santen, Steadman, Chiara & Simpson

[57] ABSTRACT

An electric source circuit is disclosed which comprises a switch for opening closed circuit consisting of first and second direct current sources, an over discharge indicator circuit provided for the first direct current source and a kick circuit provided for a DC-DC converter inclusive of a pulse oscillator when an electric source switch common to both the first and second direct current sources is OFF.

This switch when closed applies a sufficiently large kick voltage to the pulse oscillator to reliably oscillate the pulse oscillator which ensure a positive current supply from the second direct current sources to the load.

3 Claims, 2 Drawing Figures

3,906,251

PLURALITY OF SELECTIVE SOURCES FOR CONVERTER SYSTEM

BACKGROUND OF THE INVENTION

1. Field of the Invention

This invention relates to an electric source circuit which makes use of a plurality of electric sources such as an exterior alternating current source, exterior direct current source, interior direct current source and the like, and which is particularly suitable as an electric source circuit for use in a portable electronic apparatus such as a portable television receiver set and the like.

2. Description of the Prior Art

Heretofore, it has been the common practice to use as such electric source circuit an electric source circuit which comprises a first direct current source, a second direct current source, an electric source switch common to both the first and second direct current sources, a load, a DC-DC converter inclusive of a pulse oscillator and for converting the voltage from the second direct current source into a given voltage and supplying the given voltage to the load, a kick circuit for the DC-DC converter and an overdischarge indicator circuit provided for the first direct current source, and in which the voltage from the first direct current source is directly supplied to the load and the voltage from the first and second direct current sources are selectively supplied to the load. Such prior art electric source circuit, however, has the disadvantage that when the exterior direct current sources are used the pulse oscillator constituting the DC-DC converter could not reliably be oscillated, and that there is a risk of the load being not supplied from the exterior direct current source.

SUMMARY OF THE INVENTION

An object of the invention is, therefore, to provide an electric source circuit which can reliably oscillate the pulse oscillator constituting the DC-DC converter.

A feature of the invention is the provision of an electric source circuit comprising a first direct current source, a second direct current source, an electric source switch common to both the first and second direct current sources, a load, a DC-DC converter which is inclusive of a pulse oscillator and for converting the voltage from the second direct current source into a given voltage and supplies the given voltage to the load, a kick circuit for the DC-DC converter and an overdischarge indicator circuit provided for the first direct current source, is hereby the voltage from the first direct current source is directly supplied to the load and the voltages from the first and second direct current sources are selectively supplied to the load, the electric source circuit comprising a switch for opening a closed circuit consisting of the first and second direct current sources, overdischarge circuit and kick circuit for the DC-DC converter when the electric source switch is OFF.

The other objects, features and advantages of the invention will now become apparent in greater detail from the following description taken in conjunction with the accompanying drawings.

DESCRIPTION OF THE PREFERRED EMBODIMENT

Figure 1:
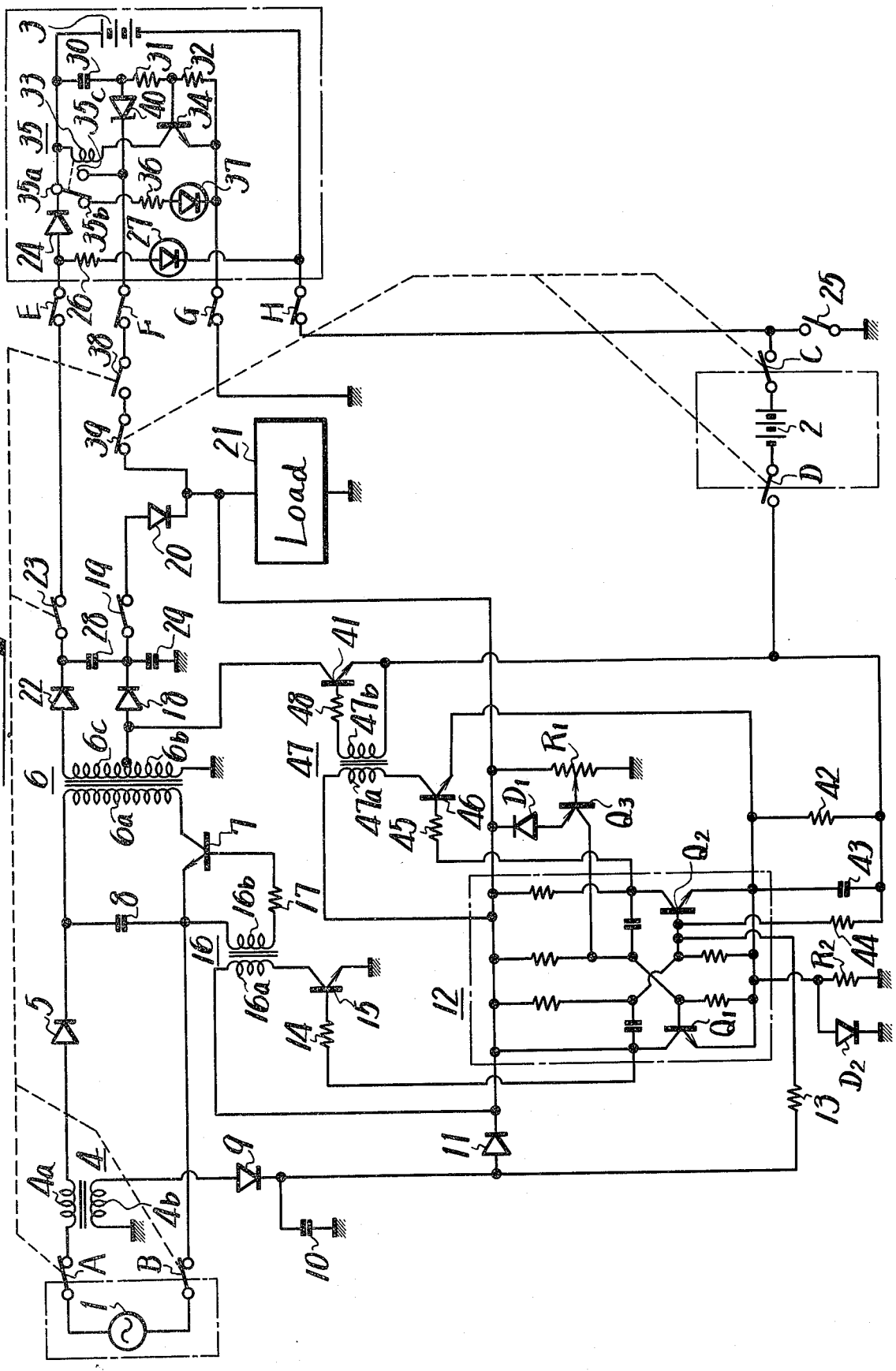
FIG. 1 is a connection diagram showing a prior art electric source circuit.

Before describing the invention, an embodiment of the prior art will now be described with reference to FIG. 1. In FIG. 1, reference numeral 1 designates an alternating current source such as a commercial electric source of 100V,50Hz and 2 a direct current source such as a charging battery for an automobile. These alternating and direct current sources 1 and 2 are connected through connection terminals A, B and C, D to a load 21, for example, a portable television receiver set, respectively. The connection terminals A, B and C, D are exclusively connected such that when the alternating current source 1 is connected to the portable television receiver set 21 the direct current source 2 is not connected thereto, and that when the direct current source 2 is connected to the portable television receiver set 21 the alternating current source 1 is not connected thereto. Reference numeral 3 shows a chargeable interior direct current source.

The connection terminal A is connected through a primary winding 4a of a transformer 4 to an anode of a diode 5 whose cathode is connected to one of terminals of a primary winding 6a of a transformer 6, the other terminal of which being connected to a collector of an NPN type transistor 7. The emitter of the transistor 7 is connected to the connection terminal B. Across the connection terminals A and B is connected the alternating current source 1. The cathode of the diode 5 is connected through a condenser 8 to the emitter of the transistor 7. One of terminals of the secondary winding 4b of the transformer 4 is grounded. The other terminal of the secondary winding 4b is connected to an anode of a diode 9 whose cathode is connected through a condenser 10 to the earth and is also connected to an anode of a diode 11. The cathode of the diode 11 is connected to an electric source terminal of a pulse oscillator 12 to be described later. The cathode of the diode 9 is also connected through a resistor 13 to a base of an NPN type transistor $Q_2$ included in the pulse oscillator 12.

The pulse oscillator 12 is composed of a transistor $Q_1$ and the transistor $Q_2$ respective bases of which are connected through condensers to the collectors of the other transistors, respectively, so as to constitute a so-called astable multivibrator. The electric source terminal of the pulse oscillator 12 is connected through a variable resistor $R_1$ to the earth. A slidable contact of the variable resistor $R_1$ is connected to a base of a PNP transistor $Q_3$ whose collector is connected to the base of the transistor $Q_1$. An emitter of the transistor $Q_3$ is connected to an anode of a Zener diode $D_1$ whose cathode is connected to the electric source terminal. In addition, a common terminal of the pulse oscillator 12 is connected through a resistor $R_2$ to the earth and a junction point between the resistor $R_2$ and the common terminal is connected to an anode of a diode $D_2$ whose cathode is grounded.

The pulse oscillator 12 constructed as above described normally operates to generate from the collectors of the transistors $Q_1$ and $Q_2$ a pulse signal having a constant frequency. However, if the voltage across the electric source terminal is increased, for example, if the transistor $Q_3$ becomes conductive at a time which is earlier than its normal time, the transistor $Q_1$ becomes conductive earlier than the transistor $Q_2$, thereby shortening the conduction period of the transistor $Q_2$. The conduction point of the transistor $Q_1$ is determined by a time constant circuit incorporated therein. That is, the pulse oscillator 12 is constructed such that its oscillating frequency becomes high when the voltage across the electric source terminal is increased.

In addition, the collector of the transistor $Q_1$ of the pulse oscillator 12 is connected through a resistor 14 to a base of a transistor 15 whose emitter is grounded and collector is connected through a primary winding 16a of a transformer 16 to the electric source terminal of the pulse oscillator 12. One of terminals of the secondary winding 16b of the transformer 16 is connected through a resistor 17 to the base of the transistor 7, the other terminal of the secondary winding 16b being connected to the emitter of the transistor 7.

The transformer 6 has its secondary winding divided into first and second secondary windings 6b and 6c. One of terminals of the first secondary winding 6b is connected to an anode of a diode 18, while the other terminal is grounded. The cathode of the diode 18 is connected through a switch 19 to an anode of a diode 20 whose cathode is connected to one of terminals of the load 21 such, for example, as a television receiver set circuit, the other therminal of the load 21 being grounded. That terminal of the load 21 which is connected to the cathode of the diode 20 is also connected to the electric source terminal of the pulse oscillator 12.

In addition, one of terminals of the secondary winding 6c is connected to an anode of a diode 22 and the other terminal of the secondary winding 6c is grounded. The cathode of the diode 22 is connected through a switch 23 interlocked with the connection terminals A, B to an anode of a diode 24 whose cathode is connected to a positive terminal of the above mentioned battery 3 whose negative terminal is connected through an electric source switch 25 to the earth. In addition, the anode of the diode 24 is connected through a resistor 26 to an anode of a photodiode 27 whose cathode is connected to a junction point between the negative terminal of the battery 3 and the electric source switch 25.

The cathode of the diode 22 is connected through a condenser 28 to the cathode of the diode 18 which is connected through a condenser 29 to the earth.

In addition, the positive terminal of the interior direct current battery 3 is connected through a series circuit including a condenser 30 and resistors 31, 32 to the earth and is also connected to one of terminals of an electromagnetic coil 33 whose another terminal is connected to a collector of an NPN type transistors 34 having a grounded emitter and a base connected to a junction point between the resistors 31, 32. The positive terminal of the interior direct current battery 3 is also connected to a movable contact 35a of a switch 35 magnetically coupled with the above mentioned electromagnetic coil 33. Provision is made of a first fixed contact 35b which becomes open when current flows the electromagnetic coil 33 of the switch 35. The first fixed contact 35b is connected through a resistor 36 to an anode of a photodiode 37 whose cathode is grounded. In addition, provision is made of a second fixed contact 35c which becomes closed when current flows the electromagnetic coil 33 of the switch 35, a switch 38 interlocked with the above mentioned connection terminals A, B and adapted to be opened when these connection terminals A, B are closed, and a switch 39 interlocked with the connection terminals C, D and adapted to be opened when these connection terminals C, D are closed. The second fixed contact 35c is connected through a series circuit including the switches 38, 39 to one of terminals of the load 2 and is also connected to a cathode of a Zener diode 40 whose anode is connected to a junction point between the condenser 30 and the resistor 31.

Provision is made of connection terminals E, F, G, H for connecting a circuit which is composed of above mentioned interior direct current battery 3, diode 34, resistors 26, 31, 32, 36, photodiodes 27, 37, condenser 30, electromagnetic coil 33, transistor 34 and switch 35 to the switches 23, 38 and grounded terminal, respectively. These connection terminals E, F, G, H permit the above mentioned circuit elements to be detached from the switches 23, 38 and grounded terminal.

In addition, the connection terminal C is connected to a junction point between the above mentioned battery 3 and the electric source switch 25 and across the connection terminals C and D is connected the direct current source 2. The connection terminal D is connected to an emitter of an NPN transistor 41 whose collector is connected to a junction point between the diode 18 and the winding 6b. The connection terminal D is also connected through a parallel circuit including a resistor 42 and a condense 43 to the emitter of the transistor $Q_2$ of the pulse oscillator 12 and is connected through a resistor 44 to the base of the transistor $Q_2$. In addition, the collector of the transistor $Q_2$ of the pulse oscillator 12 is connected through a resistor 45 to a base of a transistor 46 whose emitter is connected to the common terminal of the pulse oscillator 12, the collector of the transistor 46 being connected through a primary winding 47a of a transformer 47 to the electric source terminal of the pulse oscillator 12. One of terminals of a secondary winding 47b of the transformer 47 is connected through a resistor 48 to the base of the transistor 41 and the other terminal of the second winding 47b is connected to the emitter of the transistor 41. A circuit including the pulse oscillator 12, resistors 45, 48, transistors 41, 46, transformer 47 and secondary winding 6b constitutes a so-called DC-DC converter.

In the above described prior art electric source circuit, if use is made of the alternating current source 1, in the first place, across the connection terminals A and B is connected the alternating current source 1, while the connection terminals C, D are made open.

As a result, the switch 39 becomes closed while the switch 38 becomes open. The voltage across the alternating current source 1 causes a half-wave rectified current obtained by the diode 5 to flow a closed loop consisting of the alternating current source 1, primary winding 4a of the transformer 4, diode 5, primary winding 6a of the transformer 6 and transistor 7. A signal obtained from the secondary winding 4b of the transformer 4 is applied through the diodes 9, 11 to the electric source terminal of the pulse oscillator 12 so as to bring it into its operative condition and also applied through the resistor 13 to the base of the transistor $Q_2$ of the pulse oscillator 12 so as to cause the pulse oscillator 12 to oscillate. The oscillation of the pulse oscillator 12 causes a conduction of the transistor 7 to be controlled, thereby controlling the voltage applied from the alternating current source 1 to the transformer 6.

The voltage obtained from the first secondary winding 6b is applied through the diode 18, switch 19 and diode 20 to the load 21 so as to drive the load 21.

If the voltage applied to one terminal of the load 21 is fed back to the electric source terminal of the pulse oscillator 12, it is possible to always make the voltage applied to the load 21 constant. That is, if the voltage applied to the load 21 is increased, for example, owing to the change of the impedance value of the load 21 or to the variation of the exterior electric source voltage, the interrupted conductive period of the transistor $Q_1$ of the pulse oscillator 12 becomes shortened, and as a result, the conductive period of the transistor 15 becomes shortened to make the conductive period of the transistor 7 short. As a result, the period for which the voltage is applied to the primary winding 6a of the transformer 6 becomes short to decrease the output voltage value from the secondary windings 6b and 6c. As seen from the above, the prior art electric source circuit constructed as above described is capable of rendering the voltage applied to the load 21 always constant in case of connecting the alternating current source 1 thereto.

In addition, the voltage obtained from the secondary winding 6c of the transformer 6 is applied from the secondary winding 6c of the transformer 6 through the diode 22, switch 23, diode 24 and electric source switch 25 to the interior direct current battery 3. As a result, if the electric source switch 25 is closed, it is possible to charge the interior direct current battery 3. The voltage obtained from the secondary winding 6c of the transformer 6 is also applied through the diode 22, switches 23, E and resistor 26 to the photodiode 27. As a result, if the electric source switch 25 is closed, the photodiode 27 becomes luminescent to indicate that the interior direct current battery 3 is being charged.

At the instant when the switch 25 is closed, current flows a series circuit including the condenser 30 and resistors 31, 32 for a period corresponding to the capacity value of the condenser 30 to make the transistor 34 conductive. As a result, the electromagnetic coil 33 is energized to produce a magnetic field which causes the movable contact 35a of the switch 35 to be closed to the fixed contact 35c, thereby applying the voltage to the Zener diode 40. The Zener voltage makes the transistor 34 conductive often the elapse of period corresponding to the above described capacity value of the condenser 30, and as a result, the transistor 34 is held in its conductive condition to hold the movable contact 35a of the switch 35 at its position closed with the second fixed contact 35c. There is no risk of the overdischarge indicating photodiode 37 being rendered luminescent.

If the connection terminals A, B and C, D are made opened and the interior direct current source 3 only serves to apply the voltage to the load 21, the switches 38 and 39 become closed. Then, if the electric source switch 25 is closed, the interior direct current battery 3 supplies current to the transistor 34 to make it conductive so that the movable contact 35a of the switch 35 is closed to the second fixed contact 35c. As a result, the voltage of the interior direct current battery 3 is applied through the switches 38 and 39 to the load 21.

If the interior direct current battery 3 becomes overdischarged to reduce its output voltage, the voltage sufficient to produce the Zener voltage is not applied to the Zener diode 40, and as a result, the transistor 34 becomes OFF so that the movable contact 35a of the switch 35 is again closed to the first fixed contact 35b, thereby applying the voltage from the interior direct current battery 3 through the resistor 36 to the photodiode 37. As a result, the photodiode 37 becomes luminescent to indicate that the battery 3 is at its overdischarge condition.

If the connection terminals C and D are closed, the exterior direct current source 2 is connected across the connection terminals C and D.

If it is desired to apply the voltage from the exterior direct current source 2 to the load 21, the connection terminals C and D are closed and the connection terminals A and B are made open, thereby opening the switches 23 and 39, respectively. Then, if the electric source switch 25 is closed, the negative voltage from the direct current source 2 is applied through the condenser 43 and resistor 44 to the emitter and base of the transistor $Q_2$ of the pulse oscillator 12, respectively. This negative voltage source as a kick voltage for the pulse oscillator 12 so as to cause it to begin its oscillation, thereby controlling the conduction of the transistor 41. As a result, the negative voltage of the exterior direct current source 2 is applied to the secondary winding 6c of the transformer 6. The voltage applied to the secondary winding 6c of the transformer 6 becomes counter electromotive force when the transistor 41 is interrupted which is then delivered to the load 21.

In the same manner as described above, if the voltage applied to the load 21 is fed back to the pulse oscillator 12, it is possible to control the frequency of the pulse oscillator 12. If the voltage applied to the load 21 is increased, the conduction period of the transistor $Q_2$ of the pulse oscillator 12 becomes shortened to make the interrupted period of the transistor 41 short, thereby reducing the output voltage value from the secondary winding 6b. In addition, even when the exterior direct current source 2 is connected to the load 21, the closing of the electric source switch 25 permits the electromagnetic coil 33 and transistor 34 to be operated. That is, even when the exterior direct current source 2 is connected to the load 21, it is possible to indicate the charged condition of the interior direct current battery 3.

The prior art electric source circuit shown in FIG. 1 has the advantages that any one of the alternating current source 1, exterior direct current source 2 and interior direct current source 3 may selectively be used, that even when the voltage values of the exterior alternating current and direct current sources become changed or even when the impedance value of the load 21 becomes changed, the voltage can be supplied to the load 21 in a stable manner, and that the discharged condition of the interior direct current battery 3 can always be indicated by the luminescence of the photodiode 37 when the interior direct current battery 3 becomes overdischarged.

In the above described prior art electric source circuit, if the exterior direct current source 2 is connected to the interior direct current source 3, a closed loop consisting of the exterior and interior direct current sources 2, 3, switch 35, resistor 36, photodiode 37, earthed terminal resistor $R_2$ and condenser 43 is formed to charge the condenser 43, Under such condition, even when the electric source switch 25 is closed, the voltage change across the condenser 43 is not sufficient to kick the pulse oscillator 12. As a result, the pulse oscillator 12 is not oscillated and there is a risk of the load 21 being not supplied from the exterior direct current source 2.

The present invention is intended to provide an improved electric source circuit by which the pulse oscillator 12 can reliably be oscillated even when the exterior direct current source 2 is used to supply the load 21 therefrom.

Figure 2:
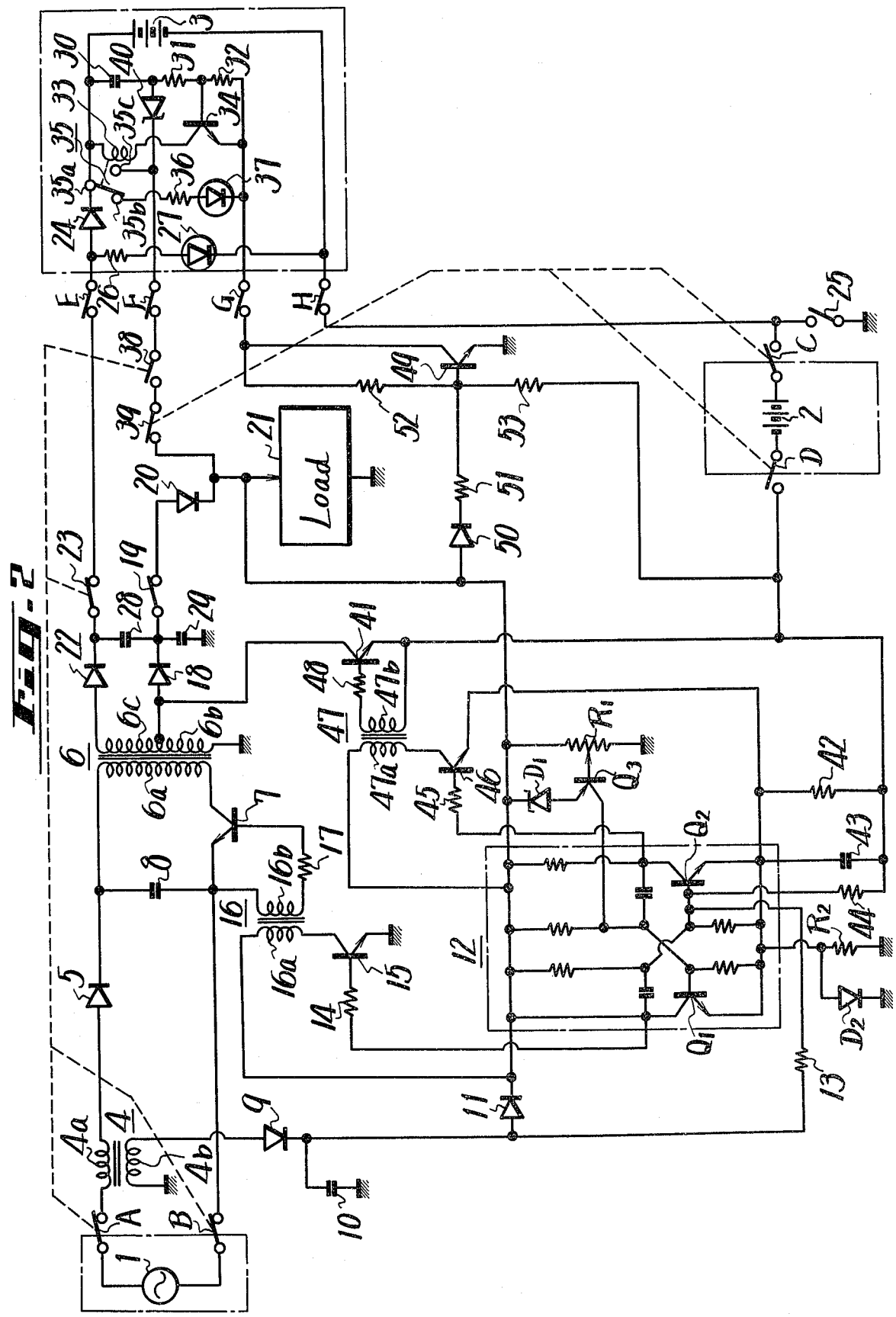
FIG. 2 is a connection diagram showing one embodiment of the electric source circuit according to the invention.

In FIG. 2 is shown one embodiment of the electric source circuit according to the invention. Parts already described with reference to FIG. 1 are denoted in FIG. 2 by the same reference numerals as in the previous prior art electric source circuit and the detailed description thereof is omitted.

In FIG. 2, the junction point among the resistor 32, the emitter of the transistor 34 and the cathode of the photodiode 37 is not grounded, but is connected to a collector of an NPN type transistor 49 whose emitter is grounded. In addition, one terminal of the load is connected to an anode of a diode 50 whose cathode is connected through a resistor 51 to the base of the transistor 49 whose collector is connected through a series circuit including resistors 52, 53 to a junction point between the connection terminal D and the condenser 43. The resistor 52 is of a large resistance value on the order of, for example, 18 KΩ, while the resistor 53 is of a resistance value on the order of 3.5KΩ. The junction point between these resistors 52 and 53 is connected to the base of the transistor 49. The other parts of the electric source circuit according to the invention shown in FIG. 2 are constructed similarly to corresponding parts of the prior art electric source circuit shown in FIG. 1.

In the electric source circuit according to the invention constructed as above described, if the exterior direct current source 2 is connected to the load 21 and the electric source switch 25 is open, the transistor 49 becomes interrupted, and as a result, the closed loop consisting of the exterior and interior direct current sources 2, 3, switch 35, resistor 36, photodiode 37, transistor 49, earthed terminal resistor $R_2$ and condenser 43 is not formed and hence the condenser 43 is not charged. As a result, the electric source circuit according to the invention can prevent the condenser 43 from being charged when the electric source switch 25 is open. If the electric source switch 25 is closed, current flows from the exterior direct current source 2 through the condenser 43 to apply a sufficiently large kick voltage to the pulse oscillator 12, thereby reliably oscillating the pulse oscillator 12.

It will be understood that the embodiment of the invention shown in FIG. 2 has additional function and effects which are the same as those of the prior art electric source circuit shown in FIG. 1.

It will be evident that the electric source circuit according to the invention is not limited to the above described embodiment and that various modifications may be made without departing from the spirit of the invention.

We claim as our invention

1. An electric source circuit comprising a first direct current source, a second direct current source, an electric source switch common to both said first and second current sources, a load, a DC-DC converter inclusive of a pulse oscillator and for converting the voltage from said second direct current source into a given voltage and supplying said given voltage to said load, a kick circuit for said DC-DC converter and an overdischarge indicator circuit provided for said first direct current source whereby the voltage from said first direct current source is directly supplied to said load and the voltages from said first and second direct current sources are selectively supplied to said load, said electric source circuit comprising a switch for opening a closed circuit consisting of said first and second direct current sources, overdischarge indicator circuit and kick circuit for said DC-DC converter when said electric source switch is OFF.

2. An electric source circuit as claimed in claim 1, wherein said switch is composed of a transistor whose emitter is grounded, base is connected through a resistor and a diode to said load and collector is connected to said overdischarge indicator circuit provided for said first direct current source and connected through a series circuit including resistors to a junction point between said direct current source and said kick circuit for said DC-DC converter.

3. An electric source circuit as claimed in claim 2, wherein said transistor is of NPN type and said resistors included in said series circuit between said collector of said transistor and said junctin point between said second direct current source and said kick circuit are of the order of 18KΩ and 3.5KΩ, respectively.

* * * * *